United States Patent
Yoshida et al.

(10) Patent No.: US 9,109,658 B2
(45) Date of Patent: Aug. 18, 2015

(54) SILENT CHAIN

(75) Inventors: Yukio Yoshida, Nabari (JP); Junichi Eda, Nabari (JP)

(73) Assignee: BorgWarner Inc., Auburn Hills, MI (US)

( * ) Notice: Subject to any disclaimer, the term of this patent is extended or adjusted under 35 U.S.C. 154(b) by 470 days.

(21) Appl. No.: 13/392,572

(22) PCT Filed: Aug. 24, 2010

(86) PCT No.: PCT/US2010/046431
§ 371 (c)(1),
(2), (4) Date: Feb. 27, 2012

(87) PCT Pub. No.: WO2011/025759
PCT Pub. Date: Mar. 3, 2011

(65) Prior Publication Data
US 2012/0157252 A1   Jun. 21, 2012

(30) Foreign Application Priority Data
Aug. 31, 2009 (JP) ................. 2009-200153

(51) Int. Cl.
*F16G 13/04* (2006.01)
*F16G 13/08* (2006.01)
(52) U.S. Cl.
CPC ............... *F16G 13/04* (2013.01); *F16G 13/08* (2013.01)
(58) Field of Classification Search
CPC ................... F16G 13/04; F16G 13/08
USPC ......................... 474/212, 213, 214
See application file for complete search history.

(56) References Cited

U.S. PATENT DOCUMENTS

| 2005/0037881 | A1* | 2/2005 | Wehler et al. | 474/206 |
| 2008/0273827 | A1* | 11/2008 | Fujiwara et al. | 384/625 |
| 2009/0042683 | A1* | 2/2009 | Tohara | 474/213 |
| 2009/0186732 | A1* | 7/2009 | Tohara et al. | 474/213 |
| 2013/0059691 | A1* | 3/2013 | Miyanaga | 474/214 |
| 2013/0203538 | A1* | 8/2013 | Miyanaga | 474/213 |
| 2013/0225345 | A1* | 8/2013 | Bodensteiner et al. | 474/206 |

FOREIGN PATENT DOCUMENTS

| JP | H11182634 A | 7/1999 | |
| JP | 2002039283 A | 2/2002 | |
| JP | 4083264 B2 | 4/2008 | |
| KR | 20080051868 A | 6/2008 | |
| WO | WO 2009155238 A2 * | 12/2009 | ............. F16G 13/04 |

OTHER PUBLICATIONS

International Search Report & Written Opinion; date of mailing May 3, 2011; for international application No. PCT/US2010/046431; 8 pages.

* cited by examiner

*Primary Examiner* — Sang Kim
*Assistant Examiner* — Diem Tran
(74) *Attorney, Agent, or Firm* — BrooksGroup

(57) ABSTRACT

A silent chain 1 in which a plurality of links 2 each having a pair of tooth parts 21 which mesh with sprockets and a pair of pin holes 20 are arranged in the lengthwise direction and thickness direction and are linked so as to be able to pivot about one another by linking pins 5 which are inserted into the pin holes 20, and sliding plates 3 are provided. The sliding plates 3 have a pair of pin holes 30 into which the linking pins 5 are inserted, and also have a back surface part 3a which has a greater back surface height $h_2$ than the back surface height $h_1$ of the links 2 and comes into contact with a tensioner arm or chain guide. The sliding plates 3 do not have tooth parts which mesh with the sprockets.

7 Claims, 4 Drawing Sheets

(a)  (b)

(a)     (b)

SILENT CHAIN

TECHNICAL FIELD

The present invention relates to a silent chain, and more specifically it relates to an improved structure for enhancing operating efficiency by further reducing friction loss during operation.

PRIOR ART

Silent chains are used as power transmission chains and timing chains in automobiles and motorcycles etc. Silent chains generally have a configuration in which a large number of links each having pairs of tooth parts and pin holes are linked together in a pivotable manner by linking pins which are inserted into each of the pin holes.

Furthermore, silent chains are wound around a drive sprocket and a driven sprocket during use, and between the drive sprocket and the driven sprocket a tensioner arm which is urged toward the chain side by means of a tensioner is disposed on the slack-side span of the silent chain, while a chain guide for guiding the travel of the silent chain is disposed on the tension-side span of the silent chain.

When the silent chain is operating, the back surface of the silent chain travels while sliding over the chain sliding surfaces of the tensioner arm and the chain guide, but this produces friction loss. This friction loss is detrimental to the operating efficiency of the silent chain.

In this regard, the applicant of this case proposed a silent chain of the type disclosed in Japanese Patent 4083264. As shown in FIGS. 2 to 4 of that publication, the silent chain has two types of links which each have a different back surface height defined by the height from the pin hole center line passing through the center of each pair of pin holes, to the uppermost position on the link back surface, and these links are assembled to construct the silent chain.

In this case, when the silent chain travels while sliding over the chain sliding surfaces of the tensioner arm and chain guide during operation of the silent chain, only the back surface parts of the links with a high back surface come into sliding contact with the chain sliding surfaces of the tensioner arm and chain guide, and therefore it is possible to reduce the contact surface area between the silent chain and the chain sliding surfaces, which makes it possible to reduce friction loss as the silent chain travels over the chain sliding surfaces.

SUMMARY OF THE INVENTION

Issues to be Resolved by the Invention

However, the links with a high back surface in this conventional structure also have pairs of tooth parts which mesh with the sprockets, in the same way as the links with a low back surface. This means that when the links flex during operation of the silent chain, the tooth parts of overlapping links slide against one another, and the edge parts along the outer peripheral edge of the tooth parts of the links come into contact with one another, and friction loss is produced as a result.

Furthermore, both the links with a high back surface and the links with a low back surface in this conventional structure have a pair of tooth parts, and therefore it is not necessarily easy to tell them apart, so it is no simple matter to reliably prevent assembly errors.

The present invention has been devised in view of the conventional situation, and the issue addressed by the present invention lies in providing a silent chain which makes it possible to further reduce friction loss during operation and to further improve operating efficiency, while also making it possible to reliably prevent assembly errors.

Means of Resolving the Issues

The invention disclosed in claim 1 is a silent chain in which a plurality of links each having a pair of tooth parts which mesh with sprockets and a pair of pin holes are arranged in the lengthwise direction and thickness direction, and are also linked so as to be able to pivot about one another by linking pins which are inserted into the pin holes, wherein sliding plates are provided. The sliding plates have a pair of pin holes into which the linking pins are inserted, and also have a back surface part which has a greater back surface height than the back surface height of the links and comes into contact with the tensioner arm or chain guide. Furthermore, the sliding plates do not have tooth parts which mesh with the sprockets.

According to the invention disclosed in claim 1, only the back surface part of the sliding plates comes into contact with the tensioner arm or chain guide when the silent chain is operating, and therefore it is possible to reduce the contact surface area of the silent chain with the tensioner arm or chain guide, which makes it possible to reduce friction loss as the silent chain travels over the tensioner arm or chain guide, so the operating efficiency can be improved.

Moreover, in this case the sliding plates do not have tooth parts which mesh with the sprockets, and therefore when the links and sliding plates flex during operation of the silent chain, the sliding plates and the tooth parts of the overlapping links do not slide against one another, and as a result it is possible to avoid producing friction loss caused by tooth parts sliding against one another; thus, friction loss during operation can be further reduced, and the operating efficiency of the silent chain can be enhanced.

Furthermore, in this case the sliding plates do not have tooth parts, so the shape thereof is clearly different from that of the links which do have tooth parts; this facilitates the sorting of sliding plates and links when the silent chain is assembled, and it is possible to reliably prevent assembly errors. It should be noted that in the silent chain disclosed in Japanese Patent 4083264, the links with a high back surface are merely thinner than the links with a low back surface and both have a pair of tooth parts, so sorting these two is not necessarily easier than sorting in the case of the invention disclosed in claim 1 of this application.

It should be noted that "back surface height" in the present specification refers to the distance from the pin hole center line passing through the center of each pair of pin holes, up to the uppermost position on the link back surface part.

In the invention disclosed in claim 2, which is in accordance with claim 1, the pin holes in the sliding plates are larger than the pin holes in the links, and the pin holes have a clearance fit with the linking pins.

In this case, the silent chain can be designed so that when a tensile load acts thereon, the sliding plates do not share the load on the silent chain. The introduction of the sliding plates therefore makes it possible to reliably prevent the load shared among the link rows from becoming unequal when a tensile load is acting on the silent chain.

In the invention disclosed in claim 3, which is in accordance with claim 1, the silent chain is provided with guide links for guiding the silent chain on the sprockets when the silent chain meshes with the sprockets, and the silent chain is made up of guide link rows comprising a set of links which are arranged in the same lengthwise position as the guide links, and non-guide link rows comprising a set of links which are arranged between adjacent guide link rows in the lengthwise direction, with the sliding plates being provided in the guide link rows.

In this case, the linking pins are fixed to the links in the guide link rows, and therefore the linking pins do not rotate with respect to the sliding plates which are arranged in the guide link rows. This means that it is possible to prevent the pin holes in the sliding plates from being worn by the linking pins.

In the invention disclosed in claim 4, which is in accordance with claim 3, the sliding plates are arranged in the central part of the guide link rows.

In this case, the central part of the silent chain comes into contact with the chain sliding surfaces of the tensioner arm and chain guide when the silent chain is traveling, making it possible to reduce the contact surface area.

In the invention disclosed in claim 5, which is in accordance with claim 3, the sliding plates are arranged at both ends of the guide link rows.

In this case, both ends of the silent chain come into contact with the chain sliding surfaces of the tensioner arm and chain guide when the silent chain is traveling, making it possible to reduce the contact surface area while the back surface parts of the silent chain can also be stably supported.

In the invention disclosed in claim 6, which is in accordance with claim 3, the sliding plates are arranged in the central part and at both ends of the guide link rows.

In this case, the central part and both ends of the silent chain come into contact with the chain sliding surfaces of the tensioner arm and chain guide when the silent chain is traveling, and the back surface parts of the silent chain can be more stably supported.

In the invention disclosed in claim 7, which is in accordance with claim 1, the back surface parts of the sliding plates have a flat shape.

In the invention disclosed in FIG. 8, which is in accordance with claim 1, the back surface parts of the sliding plates have a convex curved shape.

In this case, the contact surface area between the back surface part of the sliding plates and the chain sliding surface of the tensioner arm or chain guide can be further reduced, and friction loss can be further reduced.

In the invention disclosed in FIG. 9, which is in accordance with claim 1, hard coating layer is formed on the back surface parts of the sliding plates.

In this case it is sufficient to form the hard coating layer only on the back surface parts of the sliding plates which come into contact with the chain sliding surfaces of the tensioner arm and chain guide, and therefore it is possible to reduce the costs involved in producing the sliding plates.

Advantage of the Invention

As described above, the silent chain according to the present invention is provided with sliding plates which comprise back surface parts that have a greater back surface height than the back surface height of the links and that come into contact with the tensioner arm or chain guide; the sliding plates are not formed with tooth parts which mesh with the sprockets, and therefore only the back surface parts of the sliding plates come into contact with the tensioner arm or chain guide when the silent chain is operating; this means that it is possible to reduce the contact surface area of the silent chain with the tensioner arm or chain guide, and as a result friction loss during operation can be reduced, and the operating efficiency can be improved. Moreover, in this case the sliding plates do not have tooth parts which mesh with the sprockets, and therefore when the links and sliding plates flex during operation of the silent chain, the sliding plates and the tooth parts of the overlapping links do not slide against one another, and as a result it is possible to avoid producing friction loss caused by tooth parts sliding against one another; thus, friction loss during operation can be further reduced, and the operating efficiency of the silent chain can be enhanced. Furthermore, in this case the sliding plates do not have tooth parts, so the shape thereof is clearly different from that of the links which do have tooth parts; this facilitates the sorting of sliding plates and links when the silent chain is assembled, and it is possible to reliably prevent assembly errors.

MODE OF EMBODIMENT OF THE INVENTION

Exemplary embodiments of the present invention will be described below in accordance with the appended figures.

[First Exemplary Embodiment]

FIGS. 1 to 5 illustrate the silent chain according to the first exemplary embodiment, and symbols which are the same in these figures indicate components which are the same or corresponding.

Figure 1:
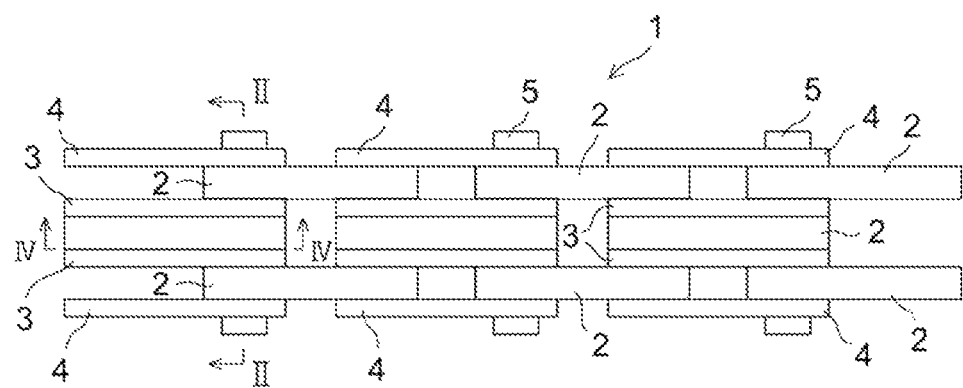
[FIG. 1] is a partial plan view showing a situation in which a silent chain according to a first exemplary embodiment of the present invention is extended in a straight line.
Figure 2:
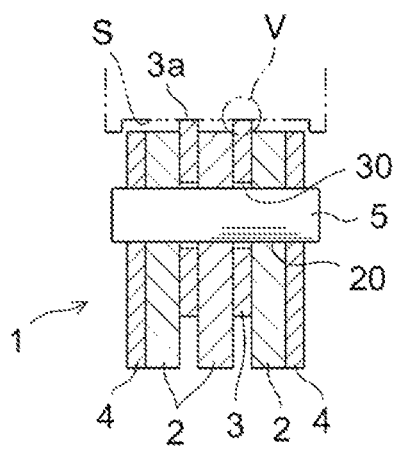
[FIG. 2] is a view in cross section along the line II-II of the silent chain (FIG. 1).
Figure 3:
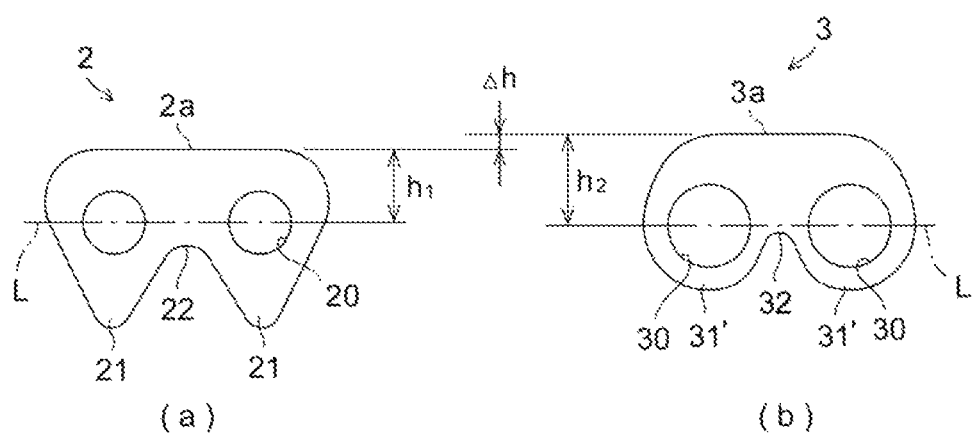
[FIG. 3] (*a*) is a front view of a link which is part of the silent chain (FIG. 1), and (*b*) is a front view of a sliding plate which is part of the silent chain (FIG. 1).

As shown in FIGS. 1 to 3, a silent chain 1 has a configuration in which a large number of links 2 each having a pair of pin holes 20 and each having a pair of tooth parts 21 which mesh with sprockets (not depicted) are arranged in the chain length direction (the horizontal direction in FIG. 1) and the chain width direction (the vertical direction in FIG. 1), and the links 2 are linked so as to be able to pivot about one another by linking pins 5 which are inserted into the pin holes 20.

The tooth parts 21 of the links 2 are linked by means of a crotch part 22. The links 2 have a substantially flat back surface part 2*a*. The links 2 have a back surface height $h_1$ which is defined by the distance from the pin hole center line L passing through the center of each pair of pin holes 20 in the links 2, to the uppermost position on the back surface parts 2*a*.

Guide links 4 for guiding the silent chain 1 around the sprockets when the silent chain 1 meshes with the sprockets are provided on the outermost side of the silent chain 1. The silent chain 1 is made up of guide link rows comprising single links 2 which are arranged in the same position in the length direction of the chain as the guide links 4 and are placed in the center in the width direction of the chain, and non-guide link rows comprising two links 2 which are arranged between adjacent guide link rows in the chain length direction and are placed at both ends in the chain width direction.

Sliding plates 3 are provided in a guide link row on both sides of the links 2 in the center in the chain width direction. That is to say, the sliding plates 3 are arranged in the central part of the guide link rows of the silent chain 1 in the first exemplary embodiment. The sliding plates 3 are placed in a stacked manner on both side surfaces of the links 2.

Figure 4:
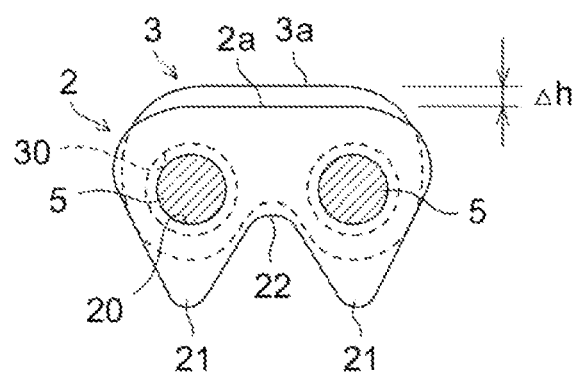
[FIG. 4] shows the sliding plate and link shown in FIG. 3 when they are placed one over the other, and corresponds to a view in cross section along IV-IV in FIG. 1.

The sliding plates 3 each have a pair of pin holes 30, and the linking pins 5 are inserted into these pin holes 30. The diameter of the pin holes 30 is greater than the diameter of the pin holes 20 in the links 2. As shown in FIG. 4, when the linking pins 5 are inserted into the pin holes 20 in the links 2 and the pin holes 30 in the sliding plates 3, the pin holes 20 in the links 2 are substantially the same size as the linking pins 5, but the pin holes 30 in the sliding plates 3 are larger than the linking pins 5, so a gap is formed with the linking pins 5. That is to say, the pin holes 30 in the sliding plates 3 have a clearance fit with the linking pins 5.

Figure 5:
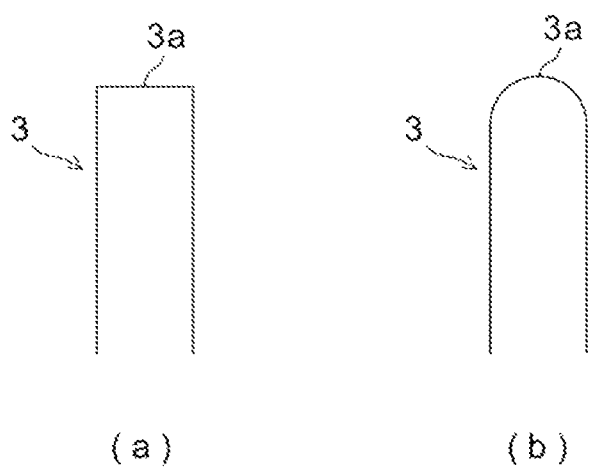
[FIGS. 5] (*a*) and (*b*) are enlargements of the portion V in FIG. 2, where (*a*) corresponds to the first exemplary embodiment, and (*b*) corresponds to another exemplary embodiment.

Furthermore, the sliding plates 3 have a substantially flat back surface part 3*a*, as shown in FIG. 5(*a*). The sliding plates 3 have a back surface height $h_2$ which is defined by the distance from the pin hole center line L passing through the center of each pair of pin holes 30, to the uppermost position on the back surface parts 3*a*. The back surface height $h_2$ is greater than the back surface height $h_1$ of the links 2. In other words:

$$h_2 > h_1 \text{ or } h_2 - h_1 = \Delta h$$

The difference $\Delta h$ between the back surface height $h_2$ and the back surface height $h_1$ is the amount by which the back surface parts 3*a* project toward the back surface side from the back surface parts 2*a* of the links 2 when the sliding plates 3 are inserted into the silent chain, as shown in FIG. 4.

A hard coating layer is formed on the back surface parts 3*a* of the sliding plates 3. An Ni—P-alloy plated layer is used as the hard coating layer, for example, but other hard coating layers may equally be employed, provided that any such layer is abrasion resistant and corrosion resistant.

As shown in FIG. 3(*b*), the sliding plates 3 have a pair of expanded parts 31' which extend downward below the openings in the pin holes 30 and which are linked by a crotch part 32, but these expanded parts 31' are not designed as tooth parts which mesh with the sprockets.

The operational effect of this exemplary embodiment will be described next.

When the silent chain 1 is operating, only the back surface parts 3*a* of the sliding plates 3 come into contact with the chain sliding surfaces S of the tensioner arm and chain guide, as shown in FIG. 2, and therefore it is possible to reduce the contact surface area of the silent chain 1 with the chain sliding surfaces S, which makes it possible to reduce friction loss as the silent chain 1 travels over the chain sliding surfaces S, so the operating efficiency can be improved.

Moreover, in this case the sliding plates 3 do not have tooth parts which mesh with the sprockets, and therefore when the links 2 and sliding plates 3 flex during operation of the silent chain 1, the sliding plates 3 and the tooth parts 21 of the overlapping links 2 do not slide against one another, and as a result it is possible to avoid producing friction loss caused by tooth parts sliding against one another; thus, friction loss during operation can be further reduced, and the operating efficiency of the silent chain 1 can be enhanced.

Furthermore, in this case the sliding plates 3 do not have tooth parts, so the shape thereof is clearly different from that of the links 2 which do have tooth parts; this facilitates the sorting of sliding plates 3 and links 2 when the silent chain 1 is assembled, and it is possible to reliably prevent assembly errors. It should be noted that in the silent chain disclosed in Japanese Patent 4083264, the links with a high back surface are merely thinner than the links with a low back surface and both have a pair of tooth parts, so sorting these two is not necessarily a simple operation.

In this case, the pin holes 30 in the sliding plates 3 are larger than the pin holes 20 in the links 2, and they have a clearance fit with the linking pins 5, and therefore it is possible to produce a structure such that when a tensile load acts on the silent chain 1 during operation of the silent chain 1, the linking pins 5 which are subjected to the tensile load and deformed are not in contact with the pin holes 30 in the sliding plates 3, so the sliding plates 3 do not share the tensile load. The introduction of the sliding plates 3 therefore makes it possible to reliably prevent the load shared among the link rows from becoming unequal when a tensile load is acting on the silent chain 1.

It should be noted that the linking pins 5 in the silent chain 1 are fixed to the links 2 in the guide link rows, and therefore it is possible to produce a structure such that the linking pins 5 do not rotate with respect to the sliding plates 3 because the sliding plates 3 are arranged in the guide link rows. This means that it is possible to prevent the pin holes 30 in the sliding plates 3 from being worn by the linking pins 5.

Furthermore, it is sufficient for the hard coating layer which is formed on the sliding plates 3 to be formed only on the back surface parts 3*a* which come into contact with the chain sliding surfaces of the tensioner arm and chain guide, and therefore it is possible to reduce the costs involved in producing the sliding plates 3.

[Second Exemplary Embodiment]

An example was described above in the first exemplary embodiment in which the sliding plates 3 are arranged in the central part of the guide link row, but this does not limit the application of the present invention. The sliding plates 3 may equally be arranged at both ends of the guide link rows.

Figure 6:
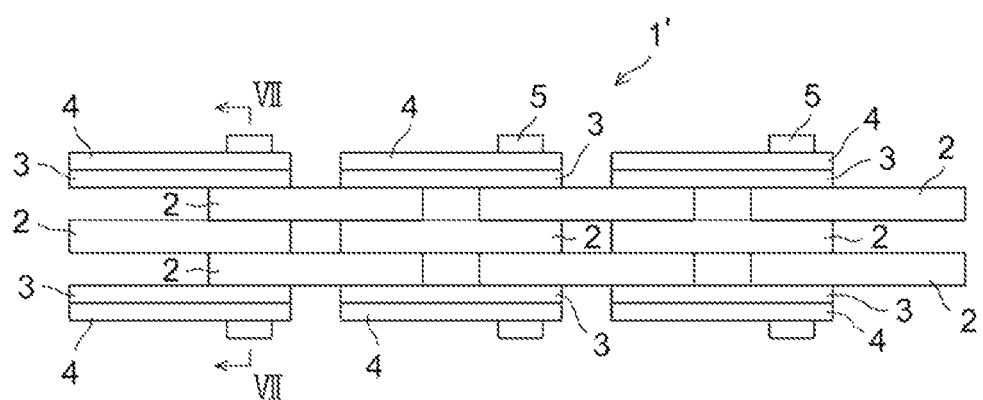
[FIG. 6] is a partial plan view showing a situation in which a silent chain according to a second exemplary embodiment of the present invention is extended in a straight line.
Figure 7:
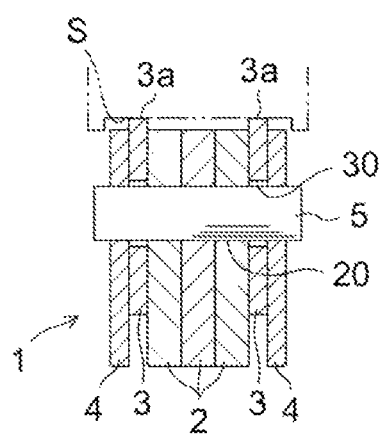
[FIG. 7] is a view in cross section along the line VII-VII of the silent chain (FIG. 6).

FIGS. 6 and 7 show the silent chain according to the second exemplary embodiment of the present invention. It should be noted that in these figures, symbols which are the same in the first exemplary embodiment indicate components which are the same or corresponding.

As shown in FIGS. 6 and 7, the sliding plates 3 are arranged on the inside of the guide links 4 at both ends of a silent chain 1'. The sliding plates 3 overlie the inner surface of the guide links 4.

The sliding plates 3 have a pair of pin holes 30 into which the linking pins 5 are inserted, the diameter of the pin holes 30 is greater than the diameter of the pin holes 20 in the links 2, and the pin holes 30 have a clearance fit with the linking pins 5, in the same way as in the first exemplary embodiment. Furthermore, the sliding plates 3 have substantially flat back surface parts 3*a* which project further toward the back surface than the back surface parts of the links 2. A hard coating layer such as an Ni—P-alloy plated layer, for example, is formed on the back surface parts 3*a* of the sliding plates 3. The sliding plates 3 do not comprise tooth parts which mesh with the sprockets.

When the silent chain 1 is operating, only the back surface parts 3*a* of the sliding plates 3 come into contact with the chain sliding surfaces S of the tensioner arm and chain guide (see FIG. 7), in the same way as in the first exemplary embodiment, thereby making it possible to reduce the surface contact area of the silent chain 1 with the chain sliding surfaces S, and this makes it possible to reduce friction loss in the silent chain 1 as it travels over the chain sliding surfaces S, and the operating efficiency can be improved.

Moreover, the sliding plates 3 do not have tooth parts which mesh with the sprockets, and therefore when the links 2 and sliding plates 3 flex during operation of the silent chain 1, the sliding plates 3 and the tooth parts 21 of the overlapping links 2 do not slide against, one another, and as a result it is possible to avoid producing friction loss caused by tooth parts sliding against one another; thus, friction loss during operation can be further reduced, and the operating efficiency of the silent chain 1 can be enhanced.

Furthermore, the sliding plates 3 do not have tooth parts, so the shape thereof is clearly different from that of the links 2 which do have tooth parts; this facilitates the sorting of sliding plates 3 and links 2 when the silent chain 1 is assembled, and it is possible to reliably prevent assembly errors.

Furthermore, the pin holes 30 in the sliding plates 3 are larger than the pin holes 20 in the links 2, and therefore it is possible to produce a structure such that when a tensile load acts on the silent chain 1 during operation of the silent chain 1, the linking pins 5 which are subjected to the tensile load and deformed are not in contact with the pin holes 30 in the sliding plates 3, so the sliding plates 3 do not share the tensile load. The introduction of the sliding plates 3 therefore makes it possible to reliably prevent the load shared among the link rows from becoming unequal when a tensile load is acting on the silent chain 1.

In addition, the sliding plates 3 are arranged in the guide link rows, which enables a structure such that the linking pins 5 do not rotate with respect to the sliding plates 3, and this makes it possible to prevent the pin holes 30 in the sliding plates 3 from being worn by the linking pins 5.

Furthermore, in this case, both ends of the silent chain 1 come into contact with the chain sliding surfaces S of the tensioner arm and chain guide when the silent chain 1 is traveling, making it possible not only to reduce the contact surface area but also to stably support the back surface parts of the silent chain 1.

It should be noted that the sliding plates 3 may be arranged in the central part of the guide link rows and also at both ends thereof.

In this case, the central part of the silent chain 1 as well as both ends thereof come into contact with the chain sliding surfaces of the tensioner arm and chain guide when the silent chain 1 is traveling, and the back surface parts of the silent chain 1 can be more stably supported.

[Other Exemplary Embodiment 1]

In each of the exemplary embodiments described above, the sliding plates 3 are formed with the pair of expanded parts 31' which have the crotch part 32 therebetween, as shown in FIG. 3(b), but this does not limit the application of the present invention. Rather than forming the crotch part 32, the expanded parts 31' may be linked by a flat surface or a curved surface. In this case, the overall shape of the sliding plates 3 becomes oval or rectangular.

[Other Exemplary Embodiment 2]

An example was described in each of the exemplary embodiments above in which the back surface parts 3a of the sliding plates 3 are substantially flat, but the back surface parts 3a may have a convex curved shape, as shown in FIG. 5(b).

In this case it is possible to further reduce the contact surface area between the back surface parts 3a of the sliding plates 3 and the chain sliding surfaces of the tensioner arm and chain guide, and friction loss can be further reduced.

[Field of Industrial Application]

The present invention is suitable for a silent chain, and especially in cases where there is a requirement for improved operating efficiency through further reductions in friction loss during operation and for reliable prevention of assembly errors.

KEY TO SYMBOLS 1, 1': silent chain
2: link
2a: back surface part
20: pin hole
21: tooth part
3: sliding plate
3a: back surface part
30: pin hole
5: linking pin
$h_1$, $h_2$: back surface height
L: pin hole center line

PRIOR ART DOCUMENTS

Patent Document

[Patent Document 1] Japanese Patent 4083264 (see FIGS. 2 to 4)

The invention claimed is:

1. A silent chain comprising a plurality of links each having a pair of tooth parts which mesh with sprockets and a pair of pin holes are arranged in a series of rows in a lengthwise direction with the links in each row stacked in a thickness direction, the rows of links being linked so as to be able to pivot about one another by linking pins which are inserted into the in holes, wherein:
  guide links are provided for guiding the silent chain on the sprockets when the silent chain meshes with the sprockets, the silent chain made up of alternate guide link rows and non-guide link rows with the guide links provided on the outermost ends of each guide link row;
  sliding plates are provided only in the guide link rows, the sliding plates have a pair of pin holes into which the linking pins are inserted, and also have a back surface part which has a first back surface height that is greater than a second back surface height of the links and comes into contact with a tensioner arm or chain guide; and the sliding plates do not have tooth parts which mesh with the sprockets so that when the plurality of links pivot, the tooth parts of the plurality of links in the non-guide link rows do not slide against the sliding plates, wherein the pin holes in the sliding plates are larger than the pin holes in the plurality of links, and the pin holes in the sliding plates have a clearance fit with the linking pins, wherein the pins do not rotate relative to the sliding plates in spite of the clearance fit.

2. The silent chain as claimed in claim 1, wherein the sliding plates are arranged in a central part of the guide link rows.

3. The silent chain as claimed in claim 1, wherein the sliding plates are arranged at both ends of the guide link rows.

4. The silent chain as claimed in claim 1, wherein the back surface parts have a flat shape in the thickness direction.

5. The silent chain as claimed in claim 1 wherein a hard coating layer is formed only on the back surface parts and not on other parts of the sliding plates.

6. A silent chain comprising a plurality of links each having a pair of tooth parts which mesh with sprockets and a pair of in holes are arranged in a series of rows in a lengthwise direction with the links in each row stacked in a thickness direction, the rows of links being linked so as to be able to pivot about one another by linking pins which are inserted into the in holes, wherein:

guide links are provided for guiding the silent chain on the sprockets when the silent chain meshes with the sprockets, the silent chain made up of alternate guide link rows and non-guide link rows with the guide links provided on the outermost ends of each guide link row;

sliding plates are provided only in the guide link rows, the sliding plates have a pair of in holes into which the linking pins are inserted, and also have a back surface part which has a first back surface height that is greater than a second back surface height of the links and comes into contact with a tensioner arm or chain guide; and the sliding plates do not have tooth parts which mesh with the sprockets so that when the plurality of links pivot, the tooth parts of the plurality of links in the non-guide link rows do not slide against the sliding plates, wherein the back surface parts have a convex curved shape in the thickness direction for a reduced contact surface area between the back surface parts of the sliding plates and the tensioner arm or chain guide.

7. The silent chain as claimed in claim 6, wherein a hard coating layer is formed only on the back surface parts and not on other parts of the sliding plates.

\* \* \* \* \*